CIRCUIT ARRANGEMENT FOR PRODUCING AN ELECTRICAL SIGNAL OF DEFINITE DURATION, ESPECIALLY FOR FREQUENCY DIVIDERS FOR ELECTRICAL PULSES

Filed Sept. 20, 1960

INVENTOR
GYÖRGY SZARVAS
BY Hane and Nydick
ATTORNEYS 3,235,745

CIRCUIT ARRANGEMENT FOR PRODUCING AN ELECTRICAL SIGNAL OF DEFINITE DURATION, ESPECIALLY FOR FREQUENCY DIVIDERS FOR ELECTRICAL PULSES

György Szarvas, Stuvsta, Sweden, assignor to Telefonaktiebolaget L M Ericsson, Stockholm, Sweden, a corporation of Sweden Filed Sept. 20, 1960, Ser. No. 57,219
Claims priority, application Sweden, Oct. 16, 1959, 9,616/59
1 Claim. (Cl. 307—88.5)

The present invention refers to a circuit arrangement for producing a signal of definite duration by means of an electrical pulse, in order to obtain a time determined control of electronic arrangements, for example to obtain frequency division by periodically suppressing a number of pulses in a pulse train. It is previously known to use oscillating circuits for time determination for the control of electronic valves, or an RC-circuit for cutting off periodically the grid of an electronic valve, so that only pulses with a certain time interval can pass. In these known arrangements the voltage jump arising upon interruption of the current is used for controlling or triggering other circuits with a certain time delay. Said principle is however not applicable if it is desirable to use transistors for triggering, for example a circuit with time delay, though it would often be desirable to replace the electronic valves by transistors. The purpose of this invention is to allow to control transistor circuits with time delay and to obtain a frequency divider that is more simple and cheaper than the earlier known arrangements but yet in greater proportion than has been possible before decreases a pulse frequency.

The arrangement according to the invention is mainly characterized by the fact that a transistor, which has to become conducting for a definite time, is connected to a resonance circuit in such a way that the inductance coil of the circuit is connected to the base of the transistor and the capacitor is connected to one of the electrodes, towards which the current through the transistor is directed, while the coil terminal and the capacitor terminal distant from the transistor, are directly interconnected, so that a pulse supplied to this point charges the capacitor in order to obtain by the discharging of the capacitor a current through the transistor, the time process of which is determined by the natural frequency of the oscillating circuit during the half-period during which the direction of the current corresponds to the passing direction of the transistor.

Figure 1:
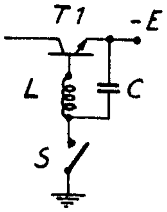
Figure 3:
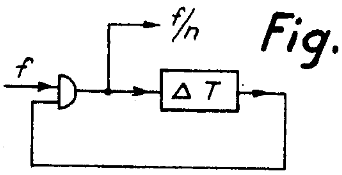
Figure 2:
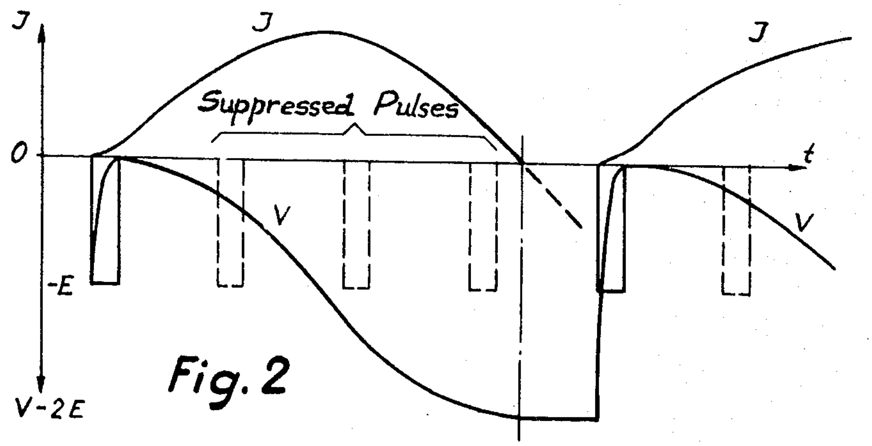
Figure 4:
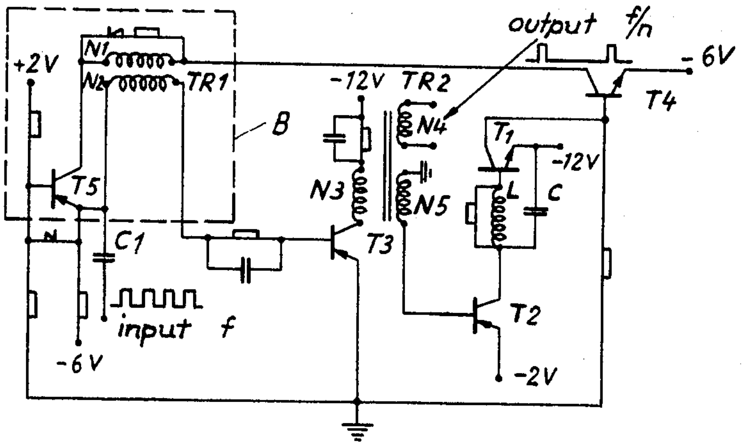

The invention will be more closely described by means of an embodiment with reference to the enclosed drawing, in which FIG. 1 shows diagrammatically the principle of the circuit arrangement, FIG. 2 is a diagram showing the voltage, the current and the incoming pulse train as a function of time, FIG. 3 shows a logic diagram of a frequency divider according to the principle of the invention and FIG. 4 shows a circuit diagram of a frequency divider making use of the circuit arrangement according to the invention.

FIG. 1 shows a circuit diagram of the circuit arrangement according to the invention. An inductance coil L is connected to the base of an NPN-transistor T1, the emitter of which is connected to a negative voltage —E. A capacitor C is connected between the emitter of the transistor and the coil terminal distant from the transistor. Between the coil L and earth a switch S is arranged, a short closing of which symbolizes a pulse of short duration connected to the coil. It may be pointed out that also a PNP-transistor can be used if the connections are changed in a corresponding way. If the base of the transistor T1 becomes more positive than the emitter, current can pass through the transistor. By closing the switch S the connecting point between the capacitor and the coil is connected to earth for a short time. Hereby the blocking condition of the transistor T1 ceases and the capacitor C is charged. When the pulse ceases and the capacitor is charged, an equalization of the potential begins through the capacitor as the latter is conducting owing to the fact that the base potential is higher than the emitter poential. An attenuated sinusoidal oscillation arises in which the current variation follows with a phase shift of 90° after the voltage variation and which oscillation would continue without the diode-effect of the transistor. As appears from the diagram in FIG. 2 the oscillation begins with an amplitude of 2E about the value —E in well known manner. As the current follows with a phase shift of 90° after the potential, the current will be maximum at ¼ of the oscillation time and will pass the zero-value when the potential reaches the most negative value at ½ of the oscillation time. After said time the path of the current will be blocked owing to the diode-effect of the transistor so that the signal obtained during the conductive condition of the transistor ceases. As appears from FIG. 2 the oscillating circuit is dimensioned in such a way that the time of a half-oscillation corresponds to the number of pulses which are to be suppressed.

FIG. 3 shows a logic diagram of a frequency divider in which by means of a pulse in a pulse train a blocking signal is generated having the same duration $\Delta T$ as the time corresponding to the number of pulses which are to be suppressed in order to obtain the desired frequency division.

FIG. 4 shows an example of the application of the invention on a frequency divider. An input signal $f$ is supplied to the blocking oscillator B which comprises a PNP-transistor T5 and a transformer TR1. The base potential of the transistor is determined in such a way that it is higher than the emitter voltage so that normally no current can pass through the transistor. If a positive pulse is supplied to the emitter through the capacitor C1, the potential of the emitter is increased in relation to the base, so that the transistor is opened and a current can pass through the primary winding N1 of the transformer TR1 to a negative potential if the NPN-transistor T4 is open. This is normally the case when the base of T4 is connected to earth and its emitter to said negative potential. The voltage increase in the primary winding N1 of TR1 induces a voltage in the secondary winding N2 which voltage is directed in such a way that the base of the PNP-transistor T3 becomes negative and the transistor conducts. When the voltage increase in the primary winding of the transformer ceases, the voltage induced in the secondary winding decreases abruptly according to the principle of the blocking oscillator and the base potential of the transistor T3 will again be of such a value that the transistor is blocked. During the time the transistor T3 conducts, a current pulse passes through it from earth to —12 v. Hereby a pulse is induced in one of the secondary windings N4 of a transformer TR2 which pulse is supplied to the output and in the other secondary winding N5 a pulse is induced that is supplied to the base of a PNP-transistor T2 so that the latter conducts. By means of the arrangement described, an amplification of the incoming pulse has been obtained before it is supplied to the base of the transistor T2. To the collector of the transistor T2 a circuit according to FIG. 1 is connected in such a way that the connecting point between the inductance coil L and the capacitor C is connected to the collector of T2, while the second terminal of the coil is connected to the base of the transistor T1 and the second terminal of the capacitor is connected to the emitter of the transistor T1. As has been explained earlier T1 is, according to the embodiment, an NPN-transistor. The collector of the transistor T1 is connected to the base of the transistor T4 which, as has been mentioned earlier, is through a resistance connected to earth, so that the transistor T4 normally conducts and the current from the transistor T5 can pass to the negative potential through T4. When the transistor T2 becomes conducting during the short duration of the output pulse, the capacitor C is charged in the oscillating circuit, whereby T1 becomes conducting for so long a time that corresponds to the duration of a half-wave in the natural frequency process of the oscillating circuit as has been explained earlier. Owing to this the transistor T4 is blocked, so that no current can pass through the transistor T5 and consequently no pulses are obtained on the output during this time. When the half-wave ceases and the transistor T1 is blocked again, T4 will be opened and current can pass again through T5 which implies that now again an output signal is obtained. Simultaneously the oscillating circuit is again operated, so that T1 becomes again conducting and the earlier procedure is repeated. The natural frequency of the oscillating circuit is determined in such a way that T1 should be conducting for a time corresponding to the duration of the number of pulses to be suppressed.

The invention is of course not limited to a frequency divider but is applicable on arrangements in which it is desirable to produce blocking or opening of a circuit during a determined time by means of a pulse, or to produce a signal at the end of a definite time period.

I claim:

A pulse frequency divider comprising: input means for receiving periodically occurring input pulses; a gating means including an input terminal connecting to said input means for receiving each input pulse received by said input means, a control terminal for receiving control pulses, and an output terminal for transmitting a received pulse only during the absence of a control pulse at the control terminal; a control pulse generator means for generating control pulses having a duration at least greater than the sum of the duration of an input pulse and the period of the input pulses, said control pulse generator means comprising a transistor including an emitter terminal, a collector terminal, a base terminal, and a rectifying base-emitter junction, an inductor including a first terminal and a second terminal, a capacitor including a first terminal and a second terminal, means for connecting the first terminal of said inductor to said base terminal, means for connecting the first terminal of said capacitor to said emitter terminal, means for interconnecting the second terminals of said inductor and said capacitor so that a resonant circuit including said inductor, said capacitor and the base-emitter junction of said transistor, connected in series, is formed, the inductance of said inductor and the capacitance of said capacitor being so chosen that the resonant circuit has a half period of resonance at least greater than the sum of the duration of the input pulse and the period of the input pulses; means for applying operating potentials to said emitter and collector terminals of said inductor and said capacitor to said input means; and means for connecting said collector terminal to the control terminal of said gating means whereby the control pulses generated by said control pulse generating means in response to input pulses received from said input means are transmitted to said gating means which blocks the transmission of input pulses therethrough during the presence of control pulses.

References Cited by the Examiner

UNITED STATES PATENTS

| | | | |
|---|---|---|---|
| 2,275,460 | 3/1942 | Page | 328—25 |
| 2,537,696 | 1/1951 | Palmer | 331—51 |
| 2,648,767 | 8/1953 | Houghton | 328—40 |
| 2,820,145 | 1/1958 | Wolfendale | 307—88.5 |
| 2,950,445 | 8/1960 | Smith et al. | 331—51 |
| 2,981,899 | 4/1961 | Hahnel | 331—116 |
| 3,037,143 | 5/1962 | Marley | 307—88.5 |

FOREIGN PATENTS

| | | |
|---|---|---|
| 873,207 | 3/1942 | France. |

JOHN W. HUCKERT, *Primary Examiner.*

GEORGE N. WESTBY, *Examiner.*